United States Patent
Peckham

(10) Patent No.: US 7,565,048 B1
(45) Date of Patent: Jul. 21, 2009

(54) UNDERSEA OPTICAL FIBER TRANSMISSION SYSTEMS

(75) Inventor: David W. Peckham, Lawrenceville, GA (US)

(73) Assignee: OFS Fitel LLC, Norcross, GA (US)

( * ) Notice: Subject to any disclaimer, the term of this patent is extended or adjusted under 35 U.S.C. 154(b) by 0 days.

(21) Appl. No.: 12/156,234

(22) Filed: May 30, 2008

(51) Int. Cl.
    *G02B 6/02* (2006.01)
(52) U.S. Cl. ...................................... 385/123
(58) Field of Classification Search ................... 385/123
    See application file for complete search history.

(56) References Cited

U.S. PATENT DOCUMENTS

| | | | |
|---|---|---|---|
| 4,852,968 A | * | 8/1989 | Reed .......................... 385/127 |
| 5,553,185 A | | 9/1996 | Antos et al. |
| 5,838,867 A | | 11/1998 | Onichi et al. |
| 5,878,182 A | | 3/1999 | Peckham |
| 6,317,549 B1 | | 11/2001 | Brown |
| 6,941,054 B2 | * | 9/2005 | Tirloni et al. ............... 385/127 |

OTHER PUBLICATIONS

Peckham et al., Advances in Fibers and Transmission Line Tech . . . , Proc. of SPIE vol. 6781, 678126, (2007).
Mohs et al., A New Dispersion Map for Undersea Optical Communication, OFC 2007, Anaheim, Mar. 25-29, 2007, paper JThA41.

* cited by examiner

*Primary Examiner*—Jerry T Rahll
(74) *Attorney, Agent, or Firm*—Peter V. D. Wilde

(57) ABSTRACT

Described are optical fibers having a relatively large effective area, large negative dispersion coefficient, and relatively low attenuation. These optical fibers are advantageously paired with positive dispersion coefficient optical fibers for blockless undersea cables.

14 Claims, 4 Drawing Sheets

UNDERSEA OPTICAL FIBER TRANSMISSION SYSTEMS

FIELD OF THE INVENTION

This invention relates to improved optical fibers, and to optical fiber cables specially adapted for long and medium haul undersea applications.

BACKGROUND OF THE INVENTION

Undersea optical fiber cables have evolved over many years to current designs in which large numbers of wavelength division multiplexed (WDM) channels provide very high transmission capacity. To reach this result the optical fiber properties are carefully managed to avoid excessive accumulated dispersion, adverse non-linear effects such as four-wave mixing, excessive transmission loss between amplifiers, excessive splice loss at each amplifier stage, etc. Typical state-of-the-art undersea cables employ transmission lengths of negative-dispersion non-zero dispersion fiber (NZDF) alternated with dispersion compensating fiber (DCF) to control the amount of accumulated dispersion over the entire transmission length. Earlier undersea cables were designed with "blocks" which covered several amplifier span lengths, i.e. the distance between amplifiers. A block would have several sequential lengths of negative dispersion transmission fiber, and would accumulate considerable negative dispersion, at which point the block would terminate with a length of DCF (positive dispersion) fiber. To keep the accumulated dispersion low, the dispersion values of these fibers were deliberately low.

Introduction of advanced optical fiber amplifier protocols allows greater accumulated negative dispersion. Accordingly, newer undersea cable designs are "blockless" and have single lengths of negative dispersion coefficient transmission fiber alternated with single lengths of DCF fiber. Accumulated dispersion values are allowed to be higher, since each alternate increment of the transmission fiber is compensated. The more advanced of these cable designs typically also add a new feature, management of dispersion slope. The dispersion slope of the negative-dispersion transmission fiber is slightly negative. This is matched with a compensating fiber with positive dispersion slope. The design of these cables is complex, since both properties—dispersion and dispersion slope—are managed simultaneously. Manufacture of these cables is also complex, with added cost. Adding further to the complexity is the relatively small effective area of negative dispersion, dispersion-slope managed optical fiber, and the relatively large attenuation. These properties have negative consequences for both transmission loss (dB per km) and also for splice loss. The overall design therefore results in significant added end-to-end loss in the cable. To preserve signal strength in the face of that added loss requires additional amplifiers, at considerable added expense. It was expected that managing the dispersion slope would provide an acceptable trade-off for added loss. However, in many cases that may not prove to be the case.

New undersea cable designs that deal more effectively with the trade-off between various optical fiber properties, and provide transmission capacity comparable to dispersion slope managed cables but at lower cost, would be desirable.

STATEMENT OF THE INVENTION

I have designed an optical fiber cable adapted for undersea applications wherein the optical fiber used in the cable is more economical, and the cable manufacturing complexity is reduced. The new optical fiber has a relatively large effective area, large negative dispersion coefficient, and relatively low attenuation. It is advantageously paired with economical standard single mode fiber (SSMF) or super large effective area fiber (SLA) for blockless undersea cable designs. The negative dispersion coefficient fiber has a significantly larger effective area than, for example, inverse dispersion fiber (IDF) thus reducing splice losses.

DETAILED DESCRIPTION

The high negative dispersion coefficient optical fiber of the invention has the following properties:

| | |
|---|---|
| Dispersion coefficient | −8 to −17 ps/nm-km, preferably −12 to −15 ps/nm-km |
| Dispersion slope | +0.03 to +0.07 ps/nm$^2$-km |
| Effective area | 40 μm2 to 60 μm$^2$, preferably 45 to 55 μm$^2$ |
| Attenuation | Less than 0.205 dB/km |

The combination of large area (LA), and large negative dispersion (LND) characterizes this optical fiber design, designated LALND.

A common goal in optical fiber design is a fiber with a refractive index profile having the so-called triple clad shape. While a wide range of optical transmission characteristics can be realized using complex index profiles, it is not straightforward to produce an optical fiber having the transmission characteristics in the table above using a simple triple clad profile. This shape includes a central core comprised mainly of silica with of index of refraction greater than that of undoped silica. The raised index of refraction of this region is typically achieved by doping the silica with germania. The core shape can be described by the well known alpha profile, but may also include an on-axis "index dip" that typically results from preform fabrication processing related issues. The core alpha parameter is typically greater than 1, but less than or equal to about 20. The central core is surrounded by an annular region with index of refraction that is less than that of undoped silica. Index of refraction within this "trench" region is approximately constant as a function of radius, although there may be regions of index transition at the inner and outer radius of the region where the index gradient with radius is not close to zero. The reduced index of refraction within the trench region is usually formed using silica doped with fluorine. The trench region is surrounded by another annular region with raised index of refraction which is referred to as the ring region. The ring region has approximately constant index of refraction, except near the region boundaries. The ring region is usually doped with germania to raise the index of refraction above that of undoped silica. The region at radius greater than the outer radius of the ring is referred to as the cladding region. The cladding region is generally formed by undoped silica, but may include regions of reduced index of refraction. A reduced index of refraction layer within the cladding region may be achieved by fluorine doping or by the presence of voids in the silica.

Figure 1:
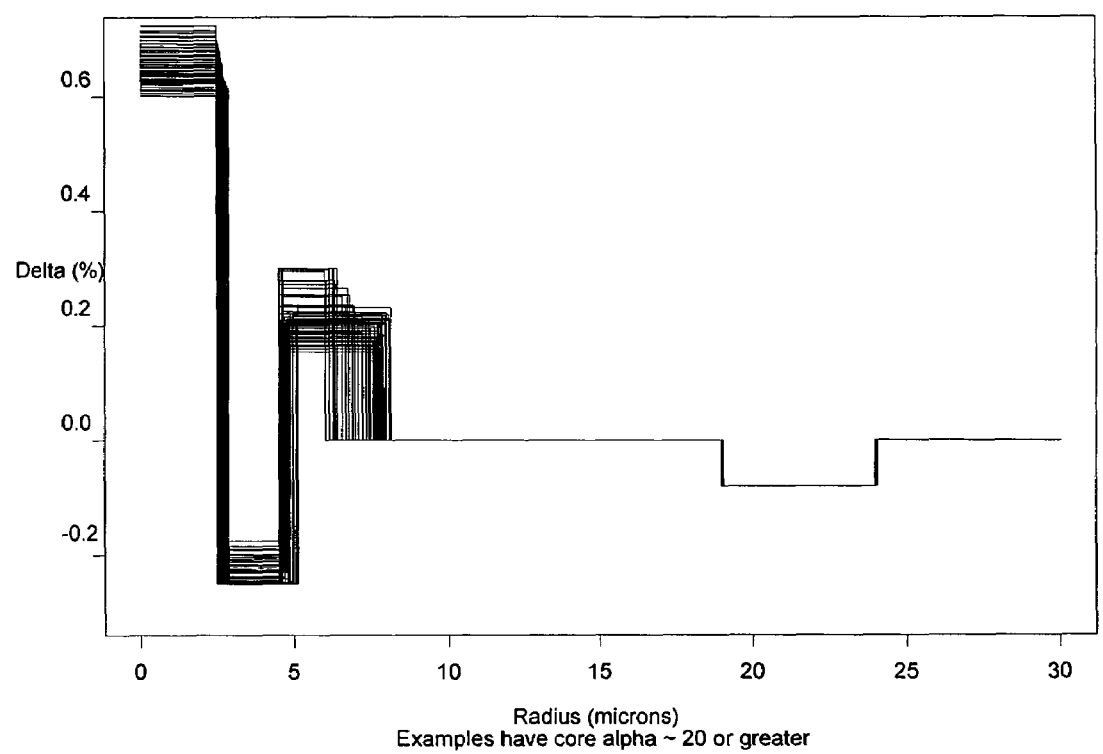
FIG. 1 illustrates refractive index profiles for optical fibers having the transmission properties of the invention.

Optical fibers with the above transmission properties, with a triple clad index profile shape and using standard fabrication techniques, are shown in FIG. 1. These profiles are desirable when the core region alpha parameter is about 20. The profile examples in FIG. 1 use a step index core shape and typically have core alpha greater than 20. In many cases it is desirable to fabricate the fiber with a graded index core described by an "alpha-profile" shape with the value of alpha in the range from about 1 to about 10. When an alpha profile is used, the core radius is typically larger and the maximum value of the core delta is typically higher than for a step index fiber with equivalent transmission properties. The same desirable transmission properties described above can be obtained with these smaller values of core alpha. Generally for a fiber with equivalent transmission properties realized with a smaller value core alpha, the core radius is slightly larger, e.g. 3-5 microns, and the maximum value of core index of refraction is slightly higher when compared to the profiles shown.

Figure 2:
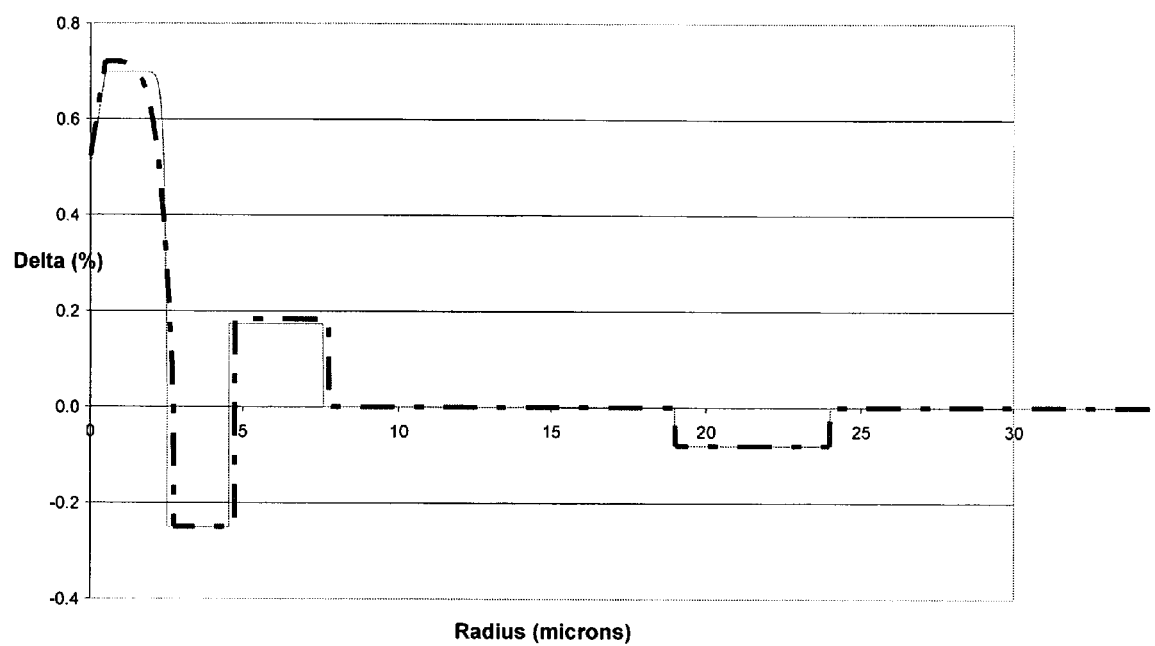
FIG. 2 shows two refractive index profiles with different core alpha.

FIG. 2 shows examples of optical fiber index of refraction profiles that achieve transmission properties within the ranges listed above. The solid curve shows a step index profile with a core alpha equal to 20. The dashed curve shows a graded index profile with a core alpha equal to 6.

In addition to those already mentioned, another optical fiber property of interest is polarization mode dispersion (PMD). PMD within acceptable limits for state-of-the-art cables is typical in optical fibers with properties and refractive index profiles just discussed. A useful specification for PMD in these optical fibers is 0.04 ps/km$^{0.5}$, or less.

The high negative dispersion coefficient optical fiber described above is designed for undersea transmission cable applications, particularly those using paired lengths of positive and negative dispersion coefficient fiber in a so-called blockless design. However, it should be understood that other applications may be found for optical fiber having these unique transmission properties.

Design of undersea cables is complicated by the fact that the amplifiers used under sea have considerably more rigid design requirements than do those used in terrestrial cable. As an example, lumped amplifiers are not used under sea. Thus amplifiers in undersea cable are expensive, and any optical fiber design that reduces power losses in the transmitted signal, even a small reduction in loss, can have a large cost impact on long lengths of undersea cable. Amplifiers typically span 80-100 km. A trans-pacific undersea cable may have dozens of amplifiers. The "Unity" Trans-Pacific cable recently announced has a nominal length of 10,000 km.

A recently developed state-of-the-art undersea cable design is a dispersion managed design using paired spans of SLA and IDF fiber. The "blocked" dispersion map is typically configured so that the average dispersion of each transmission fiber amplifier spans 24 ps/nm-km with one compensation fiber amplifier span placed after roughly 10 transmission amplifier spans. This so-called blocked design manages both accumulated dispersion and dispersion slope. SLA fiber has a relatively small positive dispersion slope, and IDF fiber has a relatively small negative dispersion slope. Also the dispersion values are opposite in sign. This allows pairs of these fibers, used in a single amplifier span, to be dispersion matched for low accumulated dispersion as well as small wavelength dispersion.

Figure 3:
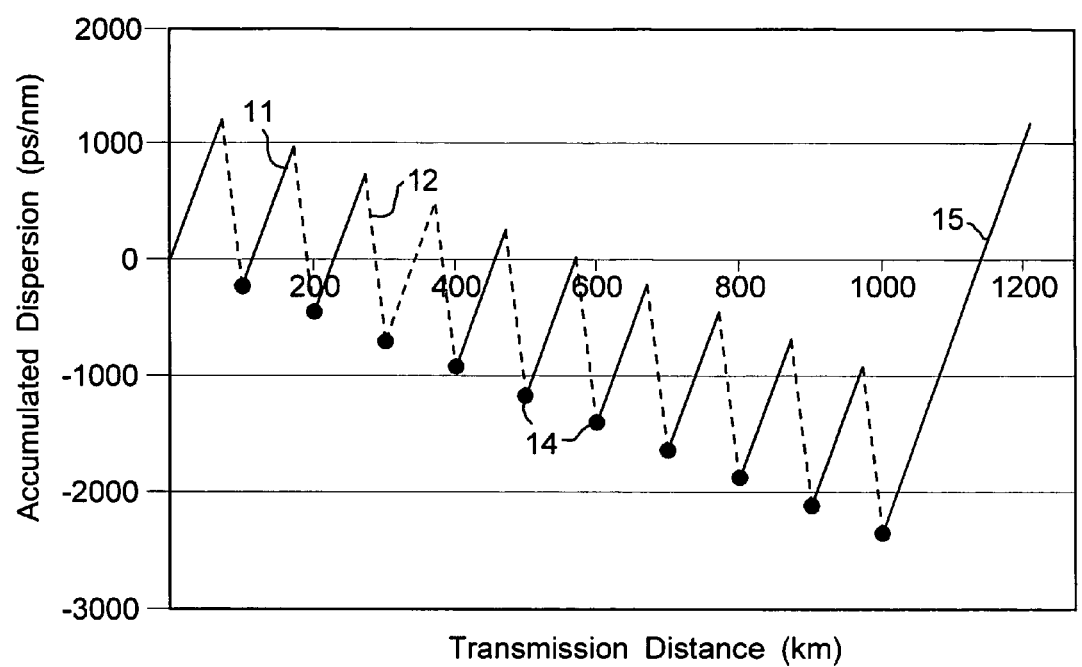
FIG. 3 is a plot of dispersion vs. length for a prior art undersea cable design showing many pairs of positive-dispersion SLA fiber and inverse dispersion fiber IDF.

With reference to the dispersion map of FIG. 3, a plot of undersea transmission distance vs. accumulated dispersion is shown. The dispersion map shown is for the dispersion and dispersion slope managed cable of the prior art. Lengths of SLA fiber are shown as solid lines (11) and paired lengths of IDF fiber are shown as dashed lines (12). The amplifiers are shown at 14. Typically, assembled cables using pairs of matched fibers accumulate negative dispersion, as shown in FIG. 3, over long lengths of transmission. A suitable length 15 of DCF is inserted at periodic intervals to reduce the accumulated dispersion and the sequence begins anew for as long a transmission path as needed. The transmission length shown may be suitable for many inter-island, or offshore applications. Intercontinental cables will have several iterations of the cable shown in FIG. 3.

It is observed that the transmission cable of FIG. 3 has amplifier spans of approximately 100 km. To extend over an undersea distance of 1000 km. requires 10 amplifiers.

Although not shown in FIG. 3, there are, in addition to the cable splices at the amplifier locations, additional fiber splices where the fiber lengths 11 and 12 are joined. The optical fibers that are spliced together at these junctions are lengths of SLA optical fiber, spliced to lengths of IDF optical fiber. While the IDF optical fiber has, as desired, a negative dispersion slope, it also has a relatively small effective area. The nominal effective area of conventional IDF optical fiber is approximately 30 μm$^2$. One consequence of this is that when a length of IDF fiber is spliced to a length of SLA fiber the splice loss is large, typically 0.3 dB. Also not shown in FIG. 3 are splices that typically occur between lengths of IDF fiber. These also have a relatively large splice loss, typically 0.11 dB. This compares with a loss per splice between SLA fibers of 0.04 dB. In addition to the increase in splice losses resulting from the use of IDF fiber, the transmission loss (attenuation) in IDF fiber is also relatively high, typically 0.23 dB/km or higher.

The total nominal loss per span (between amplifiers) for an SLA-IDF pair, assuming one SLA to SLA splice in each SLA length (0.04 dB), one IDF to IDF splice in each IDF length (0.11 dB), and one SLA to IDF splice (0.3 dB), and given a transmission loss figure of 0.185 for SLA fiber and 0.235 for IDF fiber, and a ratio of lengths of SLA to IDF of 34/66 for a dispersion slope matched pair, the loss per span is:

Transmission loss: (66×0.185)+(34×0.235)=21.8 dB

Splice loss: 0.04+0.11+0.3=0.45 dB

Total loss per span=22.25 dB

Figure 4:
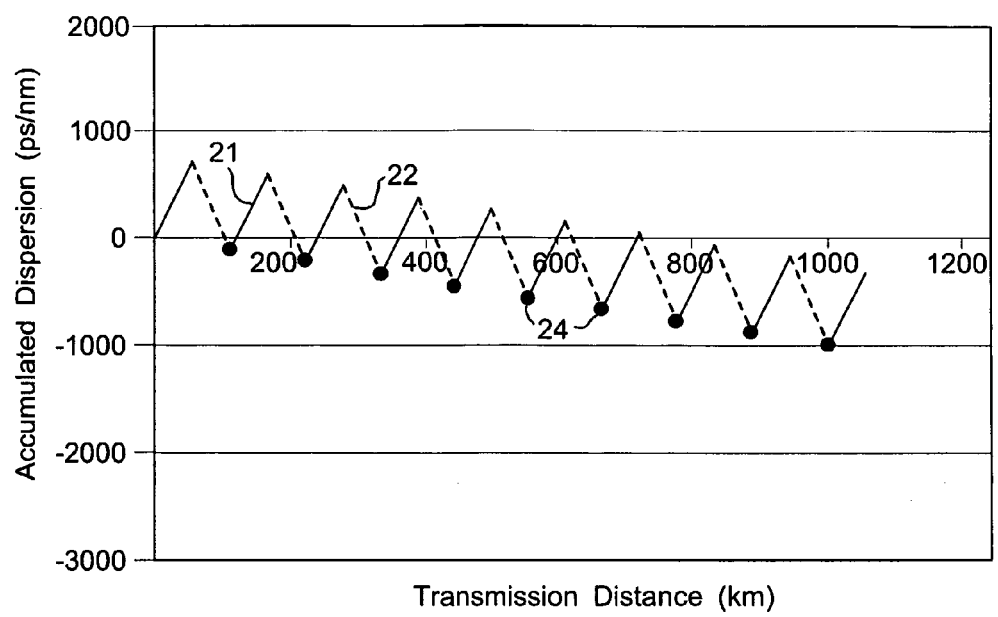
FIG. 4 is a plot similar to that of FIG. 3 showing the undersea cable design of the invention with high positive dispersion coefficient SLA transmission fiber paired with the negative dispersion coefficient fiber of the invention.

A similar undersea cable design with the negative-dispersion optical fiber of the invention (LALND) substituted for the IDF fiber just discussed is shown in FIG. 4. The solid lines 21 represent SLA fiber lengths and the dashed lines 22 represent lengths of LALND. It is evident in this figure that the dispersion value is less negative, so the ratio of lengths of SLA to LALND is more nearly equal, 20/14 for SLA, or 17/14 for SSM. The amplifiers are shown at 24. The dispersion map shows a slight excess of negative dispersion per pair to step the accumulated dispersion below zero. The overall slope of the dispersion map is a design choice that depends on the chosen length ratio of SLA to LALND.

The advantage of lower transmission loss and lower splice loss that is attributable to the use of LALND fiber is evident in FIG. 4. The span length between fibers is increased, so that only 9 amplifiers are required per 1,000 km. In a 10,000 km undersea cable, that allows a saving of 10 amplifiers, a significant cost advantage.

The loss calculation corresponding to the one above is shown below. The splice loss of SLA to SLA is 0.04 (as before). The splice loss of SLA to LALND is approximately 0.12 (reduced from the SLA to IDF splice loss because of the larger effective area of the LALND fiber). The splice loss of LALND to LALND is 0.05 (again due mainly to the large effective area of LALND fiber).

Transmission loss is 0.185 dB/km for the SLA lengths (as before) and 0.2 dB/km for the LALND lengths. Dispersion is 20 ps/nm-km for SLA and −14 ps/nm-km for LALND. The ratio of the lengths of SLA to LALND to produce low accumulated dispersion (slightly negative) is 4 to 3. The overall span loss per 100 km. is:

Transmission loss: (57×0.185)+(43×0.2)=19.1 dB

Splice loss: 0.04+0.05+0.12=0.21 dB

Total loss per 100 km span=19.31 dB

Comparing this with the 22.25 dB loss per span of the SLA/IDF combination shows a 13% improvement in overall loss.

The example used in the comparative study above is a combination using SLA fiber. This fiber typically has a relatively large positive dispersion coefficient, i.e. 18 ps/nm-km. or higher. For undersea applications wherein the LALND fiber of the invention is paired with positive dispersion coefficient optical fiber it is preferred that the positive coefficient be at least 10 ps/nm-km. or greater. This allows the ratio of positive to negative dispersion coefficient fiber to be at least one, or close to one, and allows the use of relatively long lengths of positive dispersion coefficient fiber, which tends to have larger effective area and lower cost than the specialized negative dispersion coefficient fibers. As indicated earlier, SSMF is especially suitable as the positive dispersion coefficient fiber. It has a positive coefficient of typically at least 16 ps/nm-km.

The number of optical fibers in a typical undersea cable may very over a wide range. For long haul links the cable may have many pairs of operational fibers. For short haul applications, a few pairs would be typical. A minimum of one operational pair and one spare pair would be expected for any undersea application.

While not a part of the invention, the amplifiers described and shown are typically erbium-doped fiber amplifiers. Other options may be found.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. Optical fiber for undersea cable comprising a glass core: and glass cladding wherein the optical fiber has the following transmission properties:
   Dispersion coefficient: −12 to −15 ps/nm-km,
   Dispersion slope: +0.03 to +0.07 ps/nm$^2$-km,
   Effective area: 40 µm$^2$ to 60 µm$^2$.

2. The optical fiber of claim 1 wherein the attenuation is less than 0.2 dB/km.

3. Optical fiber of claim 1 wherein the effective area is 40 to 50 µm$^2$.

4. Optical fiber of claim 1 wherein the core has a step index with an alpha greater than 20.

5. Optical fiber of claim 1 wherein the core has a graded index with an alpha of 1-10.

6. Optical fiber of claim 1 wherein the polarization mode dispersion is 0.04 ps/km$^{0.5}$, or less.

7. Optical fiber undersea cable comprising at least two pairs of optical fiber transmission paths wherein each of the transmission paths comprises a length of positive dispersion coefficient optical fiber coupled to an amplifier and coupled to a length of negative dispersion coefficient optical fiber and the length of negative coefficient optical fiber comprises the optical fiber with the following transmission properties:
   Dispersion coefficient: −12 to −15 ps/nm-km
   Dispersion slope: +0.03 to +0.07 ps/nm$^2$-km.
   Effective area: 40 µm$^2$ to 60 µm$^2$.

8. The optical fiber undersea cable of claim 7 wherein the positive coefficient optical fiber has a positive coefficient of at least 10 ps/nm-km.

9. The optical fiber undersea cable of claim 8 wherein the positive coefficient optical fiber is optical fiber with a positive coefficient of at least 18 ps/nm-km.

10. The optical fiber undersea cable of claim 8 wherein the positive coefficient optical fiber is optical fiber with a positive coefficient of at least 16 ps/nm-km.

11. The optical fiber undersea cable of claim 7 wherein the ratio of the length of positive coefficient optical fiber to the length of negative dispersion coefficient optical fiber greater than or equal to 1.

12. The optical fiber undersea cable of claim 7 wherein the length of positive dispersion coefficient optical fiber coupled to a length of negative dispersion coefficient optical fiber has a combined length of at least 80 km.

13. The optical fiber undersea cable of claim 12 wherein the length of negative dispersion coefficient optical fiber cable is coupled to the input of an optical fiber amplifier.

14. The optical fiber undersea cable of claim 12 wherein the length of positive dispersion coefficient optical fiber cable is coupled to the output of an optical fiber amplifier.

* * * * *